No. 752,812. Patented February 23, 1904.

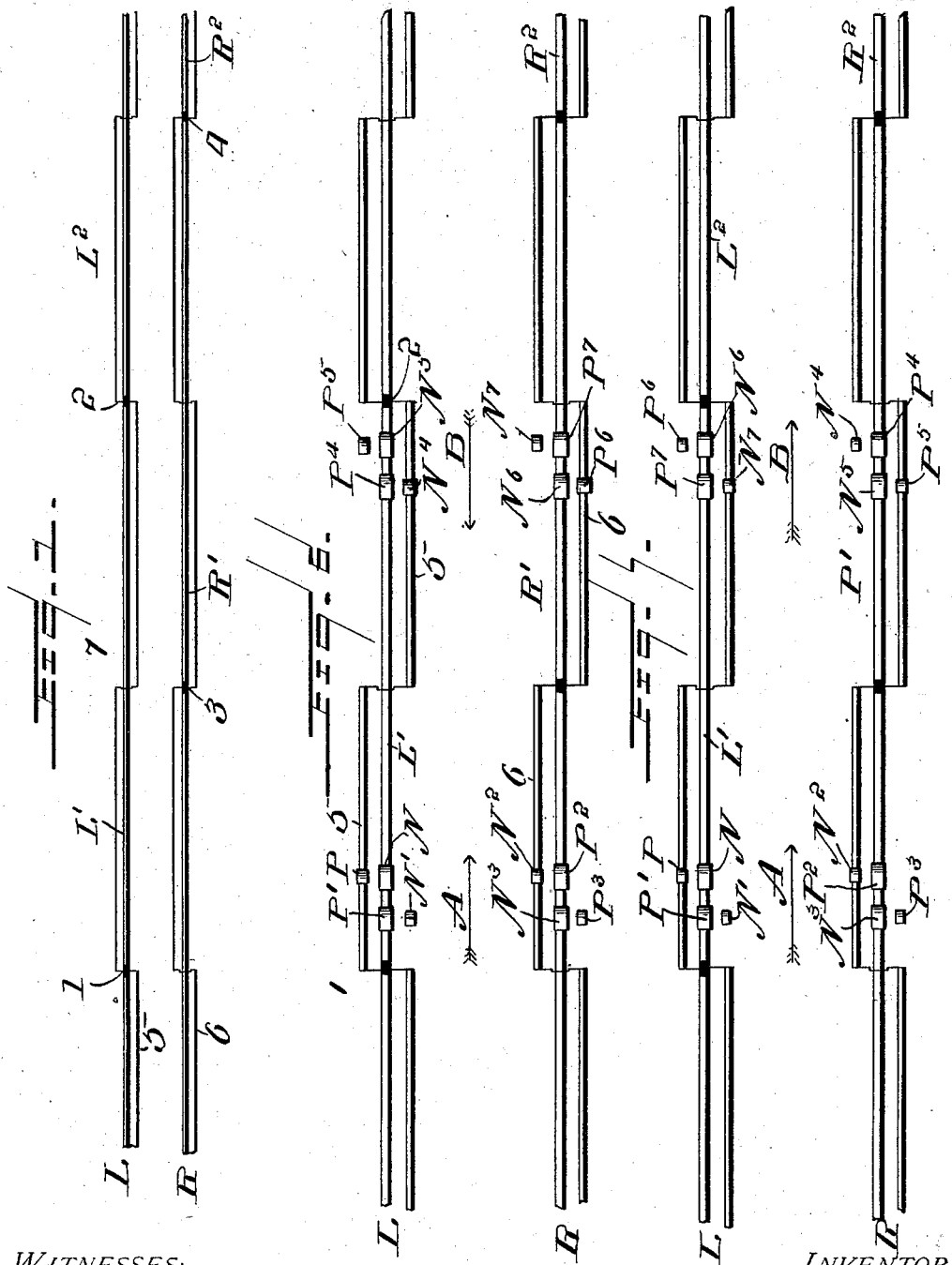

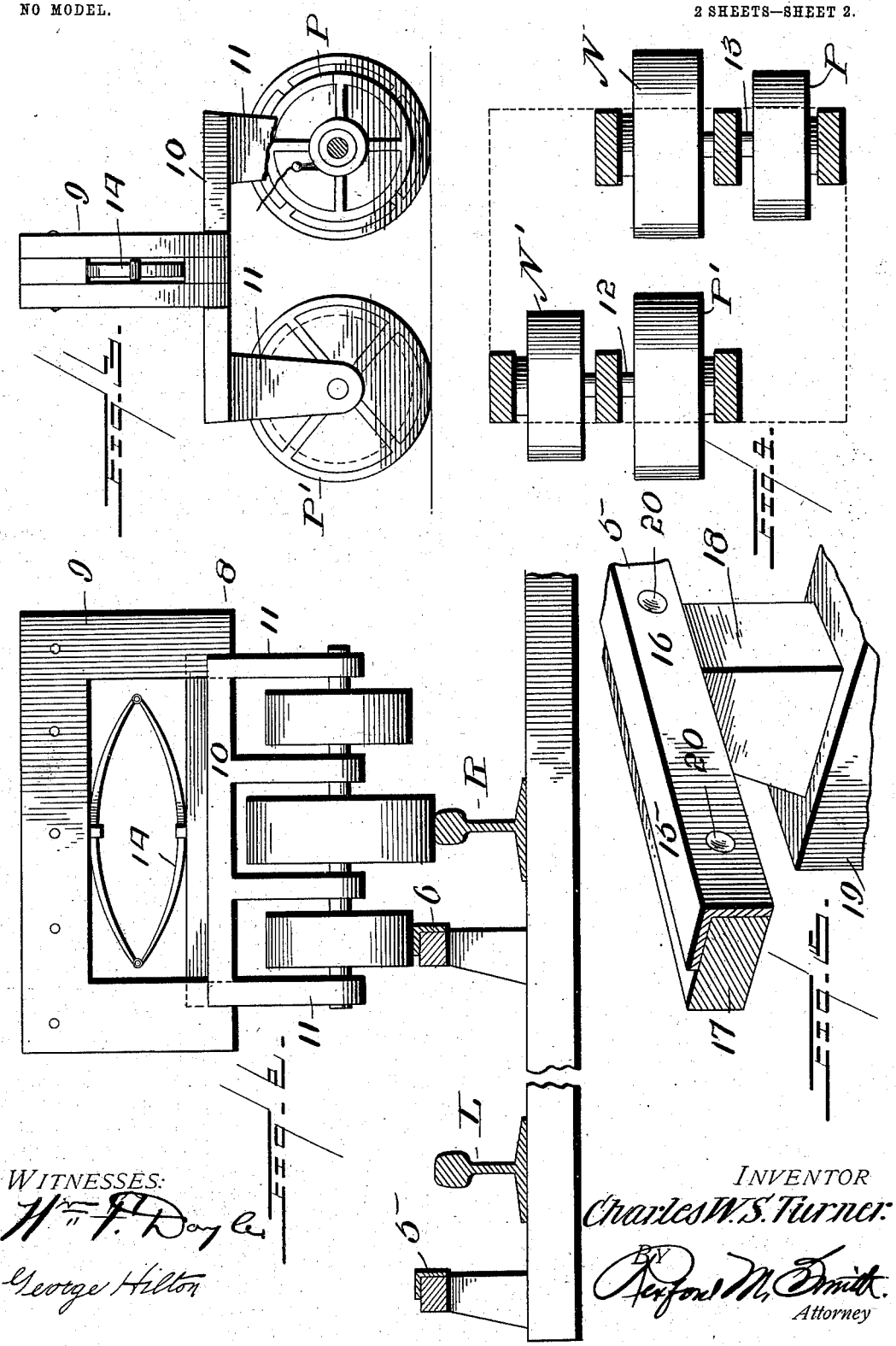

UNITED STATES PATENT OFFICE.

CHARLES W. S. TURNER, OF MOUNTVILLE, VIRGINIA.

ELECTRIC BLOCK-SIGNAL SYSTEM.

SPECIFICATION forming part of Letters Patent No. 752,812, dated February 23, 1904.

Application filed April 3, 1903. Serial No. 150,979. (No model.)

*To all whom it may concern:*

Be it known that I, CHARLES W. S. TURNER, a citizen of the United States, residing at Mountville, in the county of Loudoun and State of Virginia, have invented a certain new and useful Electric Block-Signal System, of which the following is a specification, reference being had therein to the accompanying drawings.

This invention relates to electric block-signal systems for railways, the invention having special reference to the road-bed and the system of wiring the same, so that with the aid of suitable appliances carried by the trains electrical communication may be established between two or more trains within a predetermined distance of each other, which electrical communication may be utilized for operating a visual or audible signal or alarm in the engine-cab of each train, or for automatically shutting off steam or motive power, or for applying brakes and stopping trains, or for establishing telegraphic or telephonic communication between the trains, or for any two or more of said purposes, as may be required.

By means of the particular system of wiring and electrically equipping the road-bed, as hereinafter described, communication is automatically established between two or more trains irrespective of whether they are traveling in the same or opposite directions, thus preventing both head-on and rear-end collisions. Perfect telephonic and telegraphic communication is established between the trains irrespective of the direction in which they are moving and also between said trains and distant stations. The system hereinafter described is also perfectly adapted for the purpose of protecting the trains from open switches, drawbridges, and the like. The rails and conductors lying adjacent thereto are normally dead or inactive and only become active and form a part of the circuit when two trains enter and occupy the same block or in case a switch or drawbridge is open in the block occupied by a train. The blocks may be of any usual or preferred length, such as one or two miles or more, the rails and conductors lying adjacent thereto being charged by batteries or electric generating devices carried by the trains.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a diagrammatic plan view of a portion of a railway road-bed equipped in accordance with the present invention. Fig. 2 is an enlarged cross-section through the road-bed, showing one of the trolleys. Fig. 3 is a side elevation of the trolley. Fig. 4 is a horizontal sectional view of the trolley, showing the arrangement of the trolley-wheels. Fig. 5 is a detail perspective view of a portion of one of the conductors. Fig. 6 is a diagrammatic plan view showing the relative disposition of the trolley-wheels when two trains enter the same block moving toward each other. Fig. 7 is a similar view illustrating the relative disposition of the trolley-wheels when two trains occupy the same block and are facing in the same direction.

Like reference characters designate corresponding parts in all figures of the drawings.

The principal feature of the present invention resides in the manner of wiring and electrically equipping a railway road-bed as illustrated in Figs. 1, 6, and 7, in which L and R designate the two rails, each of which is divided at suitable points by means of insulation 1, 2, 3, and 4 into sections or blocks, which may be one or two miles, more or less, according to existing conditions and requirements. In dividing the rails into sections or blocks the rails between any two points of insulation, as 1 and 2, are electrically connected, as by the usual fish-plates or bonds, so that the electric current may pass the entire length of any insulated section. The insulated rail-sections are also arranged in such manner that any one point of insulation in one rail is arranged approximately opposite the center of the oppositely-lying insulated section of the other rail. For example, the insulated point 3 of the rail R is located about opposite the center of the insulated section of the rail L between the points 1 and 2, the rail-sections being thus arranged to overlap each other or break joint about equally.

Running parallel with each rail L and R is a continuous electrical conductor 5 and 6, which may consist of a wire or strip of metal of any suitable form supported by suitable means adjacent to and parallel with the rail in connection with which it operates. By reference to Fig. 1 it will be seen that the conductor 5 extends for the distance of approximately one-half of a rail-section or block upon the inside or between two rails. Upon reaching the insulated point—for example, the point 1—the conductor 5 crosses the rail and then extends along the outside thereof parallel therewith for the distance of another half rail-section or block, when it again crosses the rail at the point 7 and extends parallel with the inner side of the rail for the remaining half of the rail-section or block, again crossing to the outside of the rail at the point of insulation 2, and so on. The same arrangement is true of the conductor 6; but it is to be noted that where the conductor 5 runs between the rails the corresponding portion of the conductor 6 lies outside of the rail adjacent thereto. Thus practically the same distance is maintained between the parallel and oppositely-lying portions of the conductors 5 and 6, both of which cross the rails at exactly opposite points. In passing the conductors across the rails said conductors may be extended either beneath the rails or through openings therein or through the insulation between the blocks or sections of the rails, it being essential that the conductors be properly insulated from the rails, so that no electrical communication be established In order to place the electrical devices carried by the train in communication with the rail-sections and continuous electrical conductors 5 and 6, hereinabove described, each train, and preferably one of the trucks of the engine or tender thereof, is equipped with a pair of what may be termed "quadruple" trolleys 8, as shown in Figs. 2, 3, and 4, each trolley consisting of a frame or guide 9, secured to such truck and provided with guideways in which is slidingly mounted a fork or yoke 10, having pendent blades or arms 11, between which are mounted trolley-wheels journaled upon or carried by suitable axles 12 and 13. These trolley-wheels travel upon the rails and conductors and are yieldingly held against the same by means of a spring 14 interposed between the slidable crown or yoke 10 and a portion of the guide-frame 9, said spring allowing the trolley to pass over any obstructions or inequalities in the roadway, while insuring perfect electrical contact therewith.

Each quadruple trolley comprises two sets of trolley-wheels, one set being designated by the reference characters P and N and the other set by the characters P' and N', and the two sets are so arranged with respect to each other that the wheel N is located in advance or in rear of the wheel P', as the case may be. The wheels P and N' are made smaller than the wheels P' and N in order that the conductors 5 and 6 may be arranged in a higher plane than the top of the rails L and R, it being necessary to elevate the conductors 5 and 6 so as to pass or cross over switches and intersecting roads without breaking the electrical connection between the devices carried by the trains. The wheels P and N are arranged in one circuit by means of wires leading from the electrical devices on the train downward to the trolley and terminally connected one to the wheel N and the other to the wheel P. In the same manner the wheels P' and N' form the terminals of another circuit. The characters P and N are employed for the purpose of designating the positive and negative terminals of the circuit, or, more accurately speaking, the positive and negative contact-points which establish electrical connection with the rail and conductor sections, and this selection of reference characters has been carried out in the diagrammatic views Figs. 6 and 7 in order that the demonstration of the practical working of this invention may be the more clearly comprehended. It is also to be understood that the two trolley-wheels on each side—for example, the wheels P and N—are insulated from each other on the shaft or axle upon which they are mounted, so that no electrical connection is established between said wheels P and N until they are placed in circuit by the corresponding trolley-wheels on another train occupying the same block at the same time.

Referring now to the diagrammatic view of Fig. 6, the operation of the invention will be understood with respect to trains or locomotives occupying the same block and traveling toward each other. As the train A enters the block between the insulated points 1 and 2 the advance wheels N and P will be in electrical contact with the rail-section L' and that portion of the conductor 5 which lies outside of the rail. At the same time the corresponding forward wheels of the other trolley for the same train—namely, the wheels $P^2$ and $N^2$—will occupy the corresponding portions of the other rail, R, and conductor 6. The other train, B, upon entering the same block will have its forward trolley-wheels $P^4$ and $N^4$ on the same rail-section L' and on the adjacent portion of the conductor 5, which runs parallel to the inner side of the rail. At the same time the forward wheels $P^6$ and $N^6$ of the other trolley on the same train will occupy the rail-section R' and that portion of the conductor 6 which lies outside of and parallel with said rail-section. It will be seen that the current will pass from the battery and through electrical devices carried by the train A downward through the wheel N, thence along the rail-section L' to the wheel P⁴, thence upward through the electrical devices of the other train, thence downward through the wheel N⁴ and along the conductor 5 to the wheel P and back to the point of beginning. The trolley-wheels, as previously stated, form the contact-points between the electrical devices carried by the train and the rail-sections and continuous electrical conductor lying adjacent thereto.

The other diagrammatic view in Fig. 7 demonstrates the working of the invention where the trains occupying the same block are heading in the same direction. The train A in Fig. 7 is facing in the same direction as the train A in Fig. 6. The train B, however, is heading in the opposite direction from Fig. 6. Nevertheless it will be seen that the current will be established between the wheels N and P⁷ in one direction and N⁷ and P in the other direction. The establishment of electrical connection between the two trains is just as effective whether the trains are traveling in the same direction or in opposite directions, no attention whatever being required on the part of the engineer and no change or adjustment of the trolleys being needed. It is also to be noted that by providing the four trolley-wheels for each trolley and locating the rail-contacting wheels one in advance of the other and the outside or smaller trolley-wheels in line therewith at opposite sides the point of insulation between the rail-sections or blocks is bridged, so that the current passes with certainty whenever two or more trains occupy the same block. It will also be understood that by means of the system of wiring hereinabove described a train standing still upon the track at any point will be notified of the approach of another train in either direction and the approaching train will be simultaneously notified, and it makes no difference how many trains approach a given point in the same or opposite directions the signaling system will operate effectively for each and every train.

By providing the continuous conductors 5 and 6 perfect telephonic and telegraphic communication is established between the points connected by said conductor and also between the trains, whether standing still or moving.

Under the preferred embodiment of this invention the electrical conductor 5 or 6 consists, by preference, of a metal strip having a flat contacting or bearing surface 15 and a flange 16, extending substantially at right angles thereto. This metal strip, which is preferably of aluminium, is secured to one of the corners or angles of a wooden stringer 17, which is supported at suitable intervals upon blocks or chairs 18, mounted upon the railway ties or sleepers 19, as shown in Fig. 5. The stringers 17 and blocks 18 are suitably secured firmly to the ties 19, while the conductor 5 is preferably secured to the stringers by means of bolts or other suitable fasteners 20, as shown.

Any form of trolley may be used in connection with the hereinabove-described system of wiring and equipping the road-bed. For example, brushes may be substituted for the trolley-wheels and the number of such brushes or wheels may be varied. The conductors 5 and 6 may consist simply of wires or strips of metal in any other form than that shown in Fig. 5. These and other changes in the form, proportion, and minor details of the invention may be resorted to without departing from the principle or sacrificing any of the advantages of the invention, the essential and important feature of which resides in the system of wiring the road-bed, as hereinabove described, and illustrated in the drawings.

Having thus described the invention, what I claim as new, and desire to secure by Letters Patent, is—

1. In an electric block-signal system for railways, a rail divided by insulation into sections or blocks each of which constitutes an electrical conductor in combination with a second electrical conductor extending along the road-bed and running substantially parallel with the rail but crossing and recrossing the same at intervals corresponding with the ends and approximate center of each insulated rail-section or block and insulated from the rail at the points of crossing.

2. In an electric block-signal system for railways, a rail divided by insulation into sections or blocks each of which forms an electrical conductor, in combination with a second electrical conductor insulated therefrom and running substantially parallel therewith but crossing and recrossing the same at intervals.

3. In an electric signal system for railways, two electrical conductors one of which is continuous and the other composed of insulated sections, said conductors running substantially parallel but crossing and recrossing each other at intervals and insulated from each other at the points where they cross, in combination with a trolley comprising two sets of contacts which are alternately associated electrically with said conductors.

4. In an electric block-signal system for railways, two electrical conductors running substantially parallel but crossing and recrossing each other at intervals and insulated from each other at the points where they cross, in combination with a trolley comprising a plurality of contacts operating in line with the parallel portions of said conductors.

5. In an electric signal system for railways, two electrical conductors running substantially parallel but crossing and recrossing each other at intervals and insulated from each other at the points where they cross, in combination with a trolley comprising two sets of contacts which are alternately associated electrically with said conductors.

6. In an electric block-signal system for railways, two electrical conductors one formed by one of the rails and the other running substantially parallel therewith but crossing and recrossing the same so as to lie alternately on opposite sides thereof and insulated from each other at the points where they cross, in combination with a trolley comprising a plurality of contacts arranged in series which are alternately brought into electrical contact with the conductors.

7. In an electric block-signal system, the rails divided into insulated sections or blocks which break joint or overlap each other, and electrical conductors running substantially parallel therewith but crossing and recrossing the rails and insulated from the rails at the points where they cross, in combination with trolleys comprising independent sets of contacts which are alternately brought into operation so that the intermediate contacts engage the rail while the others alternately engage the outside and inside portions of the crossing conductor.

8. In an electric block-signal system, the rails divided into insulated sections or blocks which break joint or overlap each other, and electrical conductors running substantially parallel therewith but crossing and recrossing the rails and insulated from the rails at the points where they cross, in combination with trolleys comprising four contacts, two of which engage the track-rail and the other two the outside and inside portions of the crossing conductors.

In testimony whereof I affix my signature in presence of two witnesses.

CHARLES W. S. TURNER.

Witnesses:
WM. MARSHALL,
HARRY P. MOORE.